United States Patent
Schleicher et al.

(10) Patent No.: US 6,957,530 B2
(45) Date of Patent: Oct. 25, 2005

(54) HYDRODYNAMIC TORQUE CONVERTER

(75) Inventors: Hermann Schleicher, Wonfurt (DE); Jürgen Ackermann, Schweinfurt (DE)

(73) Assignee: ZF Sachs AG, Schweinfurt (DE)

(*) Notice: Subject to any disclaimer, the term of this patent is extended or adjusted under 35 U.S.C. 154(b) by 19 days.

(21) Appl. No.: 10/725,986

(22) Filed: Dec. 2, 2003

(65) Prior Publication Data

US 2004/0107698 A1 Jun. 10, 2004

(30) Foreign Application Priority Data

Dec. 6, 2002 (DE) .......................................... 102 57 349

(51) Int. Cl.[7] .............................................. F16H 41/26
(52) U.S. Cl. .......................................... 60/367; 60/364
(58) Field of Search .................... 60/334, 364, 365, 60/366, 367; 416/180, 197 C (56) References Cited

U.S. PATENT DOCUMENTS

| | | | | |
|---|---|---|---|---|
| 2,745,354 A | * | 5/1956 | English et al. | 60/367 |
| 2,752,859 A | * | 7/1956 | Zeidler | 60/367 |
| 2,779,292 A | * | 1/1957 | Zeidler | 60/367 |
| 2,855,852 A | * | 10/1958 | Gamble | 60/367 |
| 2,890,661 A | * | 6/1959 | Egbert | 60/367 |
| 3,545,883 A | * | 12/1970 | Iijima | 60/367 |
| 3,782,855 A | * | 1/1974 | Batteux | 416/180 |
| 4,665,693 A | * | 5/1987 | Misu et al. | 60/367 |
| 5,109,604 A | * | 5/1992 | Koebele | 416/180 |
| 5,771,691 A | * | 6/1998 | Kirkwood et al. | 60/366 |

FOREIGN PATENT DOCUMENTS

EP          0 070 662          1/1983

* cited by examiner

Primary Examiner—Thomas E. Lazo
(74) Attorney, Agent, or Firm—Cohen, Pontani, Lieberman & Pavane (57) ABSTRACT

A hydrodynamic torque converter which has at least a hydrodynamic circuit including at least one pump wheel and one turbine wheel, wherein each of these wheels is provided with an outer shell to accept a set of vanes which form flow chambers, the inner edges of the vanes away from the outer shell being connected to an inner shell, which acts as part of an internal torus. At least the vanes of the turbine wheel have connecting elements both on the inner edges and on the outer edges, which connecting elements pass through openings in the shells to fasten the vanes to the shells, being provided for this purpose with a predetermined minimum overhang with respect to the edge of the associated vane, this minimum overhang making it possible for the connecting elements to be plastically deformed in such a way that they can grip the rear surfaces of the shells, i.e., the surfaces facing away from the vanes, and thus fasten the vanes to the shells. The connecting elements are designed in such a way that, without detriment to the predetermined ability to withstand the pressure produced by the hydrodynamic circuit, it is possible to introduce and to fasten the vanes easily, even in the case of rotors with extremely small radial dimensions and thus with very sharply curved outer and inner shells for the vanes.

13 Claims, 6 Drawing Sheets

HYDRODYNAMIC TORQUE CONVERTER

BACKGROUND OF THE INVENTION

1. Field of the Invention

The invention pertains to a hydrodynamic torque converter of the type having a pump wheel and a turbine wheel, wherein each wheel has an outer shell, an inner shell, and a plurality of vanes connecting the shells.

2. Description of the Related Art

A hydrodynamic torque converter with a hydrodynamic circuit including at least one pump wheel and one turbine wheel is known from EP 0 070 662 A1, where both the pump wheel and the turbine wheel are provided with an outer shell which accepts a set of vanes serving to form flow chambers, and where, on the edges facing away from the associated outer shell, the vanes are provided with an inner shell, which acts as part of an internal torus. The vanes of the turbine wheel have connecting elements in the form of integral tabs both on the edges facing the outer shell and on the edges facing the inner shell; so that the tabs can connect the vanes to the shells, they pass through openings in the latter and have a predetermined minimum overhang with respect to the edge of the associated vane. This minimum overhang makes it possible for the connecting elements to be plastically deformed. The tabs thus grip the rear surface of the shell, i.e., the surface facing away from the vanes, and thus fasten the vanes to the shells. In the case of the pump wheel, the vanes are connected in the same way to the inner shell, but a different approach is preferred for connecting the edges of the vanes facing the outer shell to the outer shell, because it is necessary not only for vanes to be attached permanently to the pump wheel but also for the converter housing to be absolutely leak-tight. For this reason, the outer shell of the pump wheel is not interrupted by openings for the connecting elements but is provided instead only with recesses for them.

As can be seen from the single figure in EP 0 070 662 A1, two connecting elements are provided to connect the vanes of the pump wheel and of the turbine wheel to their inner shells, whereas three connecting elements are provided to attach the vanes of the turbine wheel to its outer shell. Deciding on this number of connecting elements for the outer shell and the inner shell, preferably for the connections in the turbine wheel, may be reasonable in the case of hydrodynamic torque converters with hydrodynamic circuits of the conventional design, but this European Offenlegungsschrift discusses a special converter design, in which the hydrodynamic circuit, designated H in the figure, is a comparatively long distance $R_i$ away from a center axis A, for which reason these types of torque converters are said in professional circles to have the "high/round" design. High/round designs offer the advantage that the hydrodynamic circuit, because of its considerable distance from the central axis in the radial direction, has only a limited height H, so that, when both the pump wheel and the turbine wheel are designed with a cross section approximating the ideal circular form, it is necessary for the hydrodynamic circuit to extend only a limited distance in the axial direction, as a result of which excellent hydrodynamic properties can be achieved in only a small amount of axial space. Because of the very sharp curves of the shells, however, it is difficult to thread the vanes and their connecting elements into the proper positions required for the attachment of the vanes to the shells, and the openings in the shells required to accept the connecting elements must be designed with the smallest possible oversize with respect to the connecting elements to ensure the required strength of the connection.

SUMMARY OF THE INVENTION

The invention is based on the object of designing the shells and vanes on at least one rotor of the hydrodynamic circuit in such a way that, even when the shell is highly curved as a result of the very compact radial dimensions of the hydrodynamic circuit, it is nevertheless easy to attach the vanes and the connections will have the desired operating strength.

Reducing the number of connecting elements on the edge of the vane facing the inner shell of the corresponding rotor by one connecting element reduces the problem which results from the need to reserve construction space for the openings which receive the connecting elements and from the small gripping area of the connecting elements, i.e., the area by which these elements grip the rear surface of the inner shell. At the same time, it is also possible to select the best possible location on the inner shell for the opening through which the connecting element passes and for the point where element grips the shell. In spite of its very small radial dimension, the shell will still have the required dimensional stability, which would be difficult to ensure if a larger number of openings were provided to accept a larger number of connecting elements. So that it is possible to maintain the predetermined ability of the vanes to withstand the pressure generated by the hydrodynamic circuit in spite of the reduction in the number of connecting elements on the edge of the vane facing the inner shell, the number of connecting elements on the edge of the vane facing the outer shell, is, according to the invention, increased by one connecting element. Thus, in comparison with the known designs, more of the pressure present in the hydrodynamic circuit is absorbed in the area of the outer shell of the rotor in question. Because the radial dimension of the outer shell is much larger than that of the inner shell and its curvature much less pronounced, providing space in the outer shell for another opening for an additional connecting element has much less negative impact than it would in the case of the inner shell.

If the hydrodynamic circuit is so compact in the radial direction that the vanes can no longer be introduced, especially when the number of outer shell-facing connecting elements of conventional design has been increased, at least one of the connecting elements is designed according to the invention both with a retaining segment, along which and only along which the minimum overhang extends, this overhang being just sufficient to grip the rear surface of the associated shell, and with a positioning segment, the overhang of which is limited to a residual overhang, smaller than the minimum overhang. The basic idea of the solution is therefore to ensure the operating strength of the connection by making the connecting element long enough in its main direction that it has a large torque-transmitting area with respect to the associated shell of the rotor, but at the same time to use only a part of the overall torque-transmitting area of the connecting element, namely, only the retaining segment, to attach the vane to the shell. This retaining segment of the connecting element will therefore be narrower than a conventional connecting element. The second part of the connecting element, namely, the positioning segment, is characterized, in contrast, by a residual overhang which is smaller than the minimum overhang of the retaining segment; this helps to reduce the size of the vane in the radial direction, especially when the connecting element with both a retaining segment and positioning segment is provided at one of the radial ends of the vane, in which case it is logical for the positioning segment to be located at the radial end point of the vane. It is easy to see that this simplifies the insertion of the vanes into the shells of the associated rotor, even if these shells are extremely small in the radial direction.

Designing at least one connecting element with both a retaining segment and a positioning segment also offers the possibility of adapting the associated opening in the shell in such a way that, even if the amount of radial space available is extremely small, the positioning segment will support itself by its support section, which faces away from the retaining segment, on an assigned boundary of the opening, so that, if this connecting element according to the invention is located at one end of the vane and another connecting element, which also has a support section by which it rests on a boundary of the associated opening, is located at the other radial end of the vane, the vane can be inserted into the associated shell in such a way that it is locked into the shell by the previously mentioned two connecting elements. If this locking takes place under a predetermined pretension, the vane will have operating strength, and it will be held rattle-free in the shell of the associated rotor.

By locating the connecting element with a retaining segment and a positioning segment preferably at one of the radial ends of the vane, this connecting element will be essentially adjacent to either the leading flow edge or to the trailing flow edge of the vane. In this case, the vane will preferably have a chamfer, which forms the boundary of the vane in this direction, at least at the radial end of the vane which is at the maximum possible distance from the connecting element which has both retaining segment and positioning segments; this chamfer, like the positioning segment, also has the effect of shortening the radial dimension of the vane. In addition, the end of the vane with the chamfer can preferably be inserted into the associated shell first, and then the vane can be pivoted by its other end into the shell around the chamfer, which functions as a center for the pivoting movement. This makes it easier to insert the retaining and positioning segments into the corresponding sections of the associated openings in the shell.

With particular reference to the sharply curved inner shell, which is extremely compact in the radial direction, it is preferable for at least one of the connecting elements for this shell to be designed to consist of multiple parts in the form of individual connecting segments; or, if the edge of the vane facing the inner shell is designed with only one connecting element, it is preferable for this single connecting element to consist of multiple connecting segments. As a result of this measure, the connecting element has the same gripping surface as in the case of a one-piece design, but the individual connecting segments can be made much narrower in the direction transverse to their main direction than a one-piece connecting element can, and, in addition, the connecting segments can be arranged with an angular offset from each other, which depends on the curvature of the vanes. Thus, if the opening provided to receive the connecting segments is also designed to consist of multiple sections, and if the angular offset of these sections of the opening corresponds to that of the connecting segments, it is guaranteed that the connecting segments will be able to grip the shell in the optimum manner with respect to space utilization. The connecting segments will thus conform optimally to the curvature of the rear surface of the inner shell.

For technical manufacturing reasons, it has been found advantageous for the connecting elements to be flat, regardless of whether they are provided on the vane edge facing the outer shell of a rotor or on the vane edge facing the inner shell, because, even in cases where the associated opening is only large enough to allow the connecting element to pass through, it is still easier to insert a flat connecting element than a curved one into its opening. In addition, because of the flatness of the connecting elements, the openings required for them can be easily adapted to suit the dimensions and the primary orientations of the connecting elements in question. This in turn makes it easier to fit the vane precisely into the associated shell of the rotor and thus to obtain the desired operating strength. Rattling noises are also eliminated. It should be kept in mind here that the openings in the shells are made before the shells are curved. If the openings in the shell must curve in order to accommodate curved connecting elements, it is therefore possible for the primary orientation and the position of these openings within the shell to change considerably as a result of the procedures required to produce the curvature of the shell.

Because the connecting segments are to be made flat, whereas the vane, for hydrodynamic reasons, can have at least one area which is curved, problems can occur especially in the areas of the vane where a flat zone, such as that of the connecting elements discussed above, passes over into a zone with curvature. For this reason, at least one of the transitions extending from the root of the connecting element to the adjacent edge of a curved vane is provided with a relief notch, which proceeds from the root of the connecting element, extends across the edge into the vane, and returns to the edge of the vane by way of a predetermined transition radius. Of course, this measure can be implemented when the vane is produced, which means that the cutting burr on the vane formed during manufacturing can be removed at the same time that the relief notch is made.

This cutting burr will form especially when the vane is produced from a metallic support material, at least one side of which is coated with a softer material such as copper. A copper coating of this type is applied by rolling the copper onto the support material; the support material thus treated is then referred to as being "copper-plated". When the copper-plated support material is cut, a precision-cut area is formed at the point where the cutting tool penetrates, whereas the remaining area deeper down in the support material breaks off as the cutting tool continues to penetrate. The fractured edge of this broken-off material digs deeply into the softer plating material on the other side, i.e., the side facing away from the cutting tool. Thus a cutting burr is formed, which does not become visible until after the plating layer is removed. After the vanes have been installed in the assigned shells of the rotor, the plating layer is removed by heating it enough so that it melts. The molten metal serves as brazing material, which creates a permanent bond between the vanes and the shells. The previously described relief notch, however, will shift the cutting burr from a more critical area of the vane into a less critical area. In addition or as an alternative, the cutting burr can be smoothed out completely or at least almost completely by a stamping operation to provide the vane with an even surface. A stamping operation of this type is preferably performed in the area of the leading flow edge and/or of the trailing flow edge of the vane in order to guarantee the smoothest possible course of the flow both where the flow of the hydrodynamic circuit enters the rotor in question and also at the point where it leaves the rotor.

It is preferable to provide the vane with a first plane of curvature in the plane which leads from the trailing flow edge toward the leading flow edge, whereas the trailing flow edge can have its own curvature extending in the main direction of the vane, this therefore being a second plane of curvature, which is offset from the first. The first plane of curvature extending away from the trailing flow edge of the vane heads essentially toward a neutral line on the vane, at which the curved zone of the vane passes over into a flat zone. This neutral line is preferably used to define the points on the edge of the vane to which the holding fins of a plate frame are attached, these points being the intersections of the neutral line with the edges of the vane. Like the holding fins and the vane itself, the frame is part of a vane plate, which can preferably be cut off from a coil of strip material for the production of the vanes and which can consist of the previously explained plate material, namely, a copper-plated metallic support material such as DD 03, that is, a standard commercial steel. Once a vane plate has been obtained in this way, various manufacturing operations can be used to form the vanes, the holding fins, and the plate frame. A stamping operation, for example, can be used to remove material from the original vane plate and thus to create the desired open areas. Then additional processes such as shaping operations can be used to give the vane the required curvature. While the vane is being subjected to these operations, it is advantageous for it to remain connected to the holding fins located in the area of the neutral line, because the neutral line represents an area of predetermined flatness. This means that the area of the vane that is held in the plate frame is an area that will not be subjected to any deformation. In areas located some distance away from this neutral line, however, that is, in areas where the vane is completely disconnected from the plate frame, the vane can be provided easily with any desired curvature. After the vane has been cut out and shaped, it can be separated by a final cutting operation from the holding fins and thus from the plate frame. The vane can now be installed in the rotor intended for it.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

DETAILED DESCRIPTION OF THE PRESENTLY PREFERRED EMBODIMENTS

Figure 1:
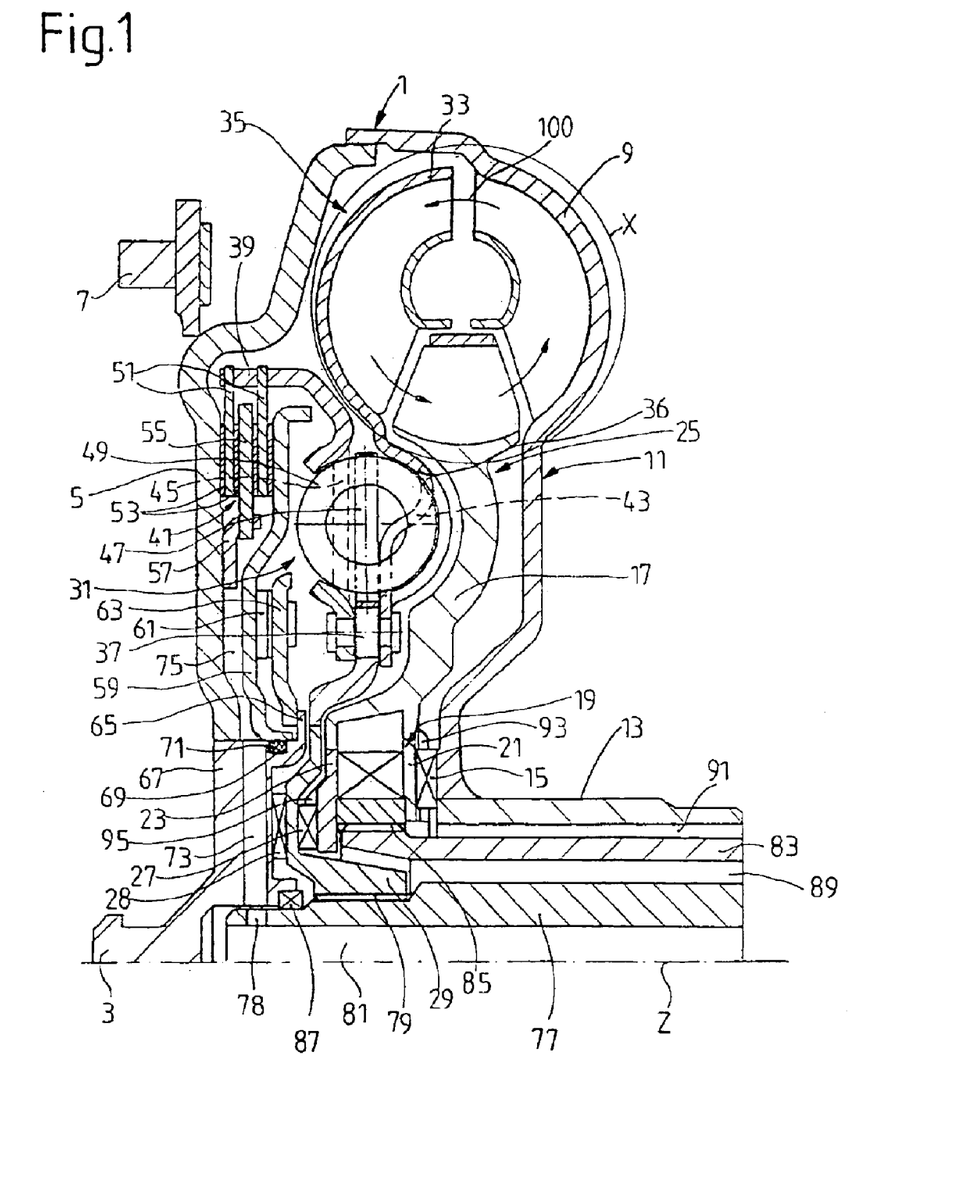
FIG. 1 shows the upper half of a hydrodynamic torque converter in cross section.

FIG. 1 shows a hydrodynamic converter with a converter housing 1, which has a bearing journal 3 in the area of a center axis Z; the journal is formed on a converter cover 5 and can be inserted in the conventional way (therefore not shown) into a socket in a crankshaft of an internal combustion engine. In the radially outer area of the converter cover 5, a fastening element 7 is provided, which is used to connect the converter housing 1 to the previously mentioned crankshaft, preferably by way of a flexplate such as that normally provided in these cases and therefore not shown.

The converter cover 5 is connected to an outer shell 9 of a pump wheel 11, the radially inner area of which continues in the form of a pump wheel hub 13, which is supported by an axial bearing 15, against which a radial shoulder 21 of a stator hub 17 of the freewheel 19 of a stator 25 rests. The stator hub 17 also has another radial shoulder 23, which is on the opposite side of the freewheel 19 and rests against an axial bearing 27, between which and another axial bearing 28 a torsional vibration damper hub 29 is mounted, which is part of a torsional vibration damper 31. Radially outside the freewheel 19, the torsional vibration damper hub 29 accepts the base 36 of the turbine wheel 35; radially further outward, this base 36 continues without interruption into the outer shell 33 of the turbine wheel 35.

The base 36 of the turbine wheel 35 is permanently connected by way of a stop 37 to an outer plate carrier 39, where this stop 37 extends through the torsional vibration damper hub 29 with play in the circumferential direction and thus allows the turbine wheel 35 and the outer plate carrier 39 to execute a certain amount of relative rotation with respect to the torsional vibration damper hub 29, where the stop 37 serves to limit the extent of this relative rotation. To supplement the stop 37, a first spring window 43 is provided in the base 36 of the turbine wheel 35, and a second spring window 45 is provided in the outer plate carrier 39, in which windows a set of circumferential springs 49 is held, where the other end of the set of circumferential springs 49 is supported by a spring window 47 in the torsional vibration damper hub 29.

The previously mentioned outer plate carrier 39, which forms part of a bridging clutch 41, holds the outer plates 51 so that they cannot rotate; the plates have friction linings 53 and are in working connection with an inner plate 55, which is attached to an anti-rotation stop 57 on the converter cover 5.

A piston 59 of the bridging clutch 41 is mounted on a converter cover hub 67 of the converter cover 5; the piston is attached to a retaining element 63 by way of a tangential leaf spring 61 so that it can shift axially but cannot rotate; this retaining element 63 is attached to a radial projection 65 of the converter cover hub 67; a groove 69, which holds a seal 71, is provided in the hub in the area where the piston 59 is seated. In addition, the converter cover hub 67 has radial channels 73, which are aligned at one end with radial bores 78 in a transmission input shaft 77; at the other end, they open into a pressure chamber 75, located axially between the converter cover 5 and the piston 59. Because the radial bores 78 are in flow connection with an internal bore 81 in the transmission input shaft 77, a positive pressure in the pressure chamber 75 will lift the piston 59 from the plates 51, 55 and thus disengage the bridging clutch 41, whereas a positive pressure on the opposite side of the piston 59 will have the effect of engaging the bridging clutch.

The transmission input shaft 77 is connected nonrotatably to the torsional vibration damper hub 29 by a set of teeth 79 and is surrounded by a support shaft 83, which forms a ring-shaped channel 89, where this support shaft 83 is connected to the freewheel 19 by a set of teeth 85 for rotation in common. The support shaft 83 is surrounded in turn by the pump wheel hub 13, which forms a ring-shaped channel 91. By way of flow channels 93, 95 in the radial shoulders 21, 23 of the stator hub 17, the ring channels 89, 91 supply a hydrodynamic circuit 100 between the pump wheel 11, the turbine wheel 35, and the stator 25. Because of the pressure prevailing in the hydrodynamic circuit 100, furthermore, pressure also acts on the side of the piston 59 facing the torsional vibration damper 31 in the manner previously described.

To help describe the details of the hydrodynamic circuit 100, reference will be made to FIG. 2, which shows vanes 102 on the pump wheel 11; the edges 104 of the vanes facing the outer shell 9 of the pump wheel 11 are fitted into grooves 106 in the outer shell 9 and are thus held in a leak-proof manner in the outer shell 9. At the edges 108 facing the inner shell 114 of the pump wheel 11, however, a connecting element 110 is provided, which fits into an opening 116 in the inner shell 114 of the pump wheel 11 and grips the rear surface 118 of the inner shell 114.

Figures 2, 3:
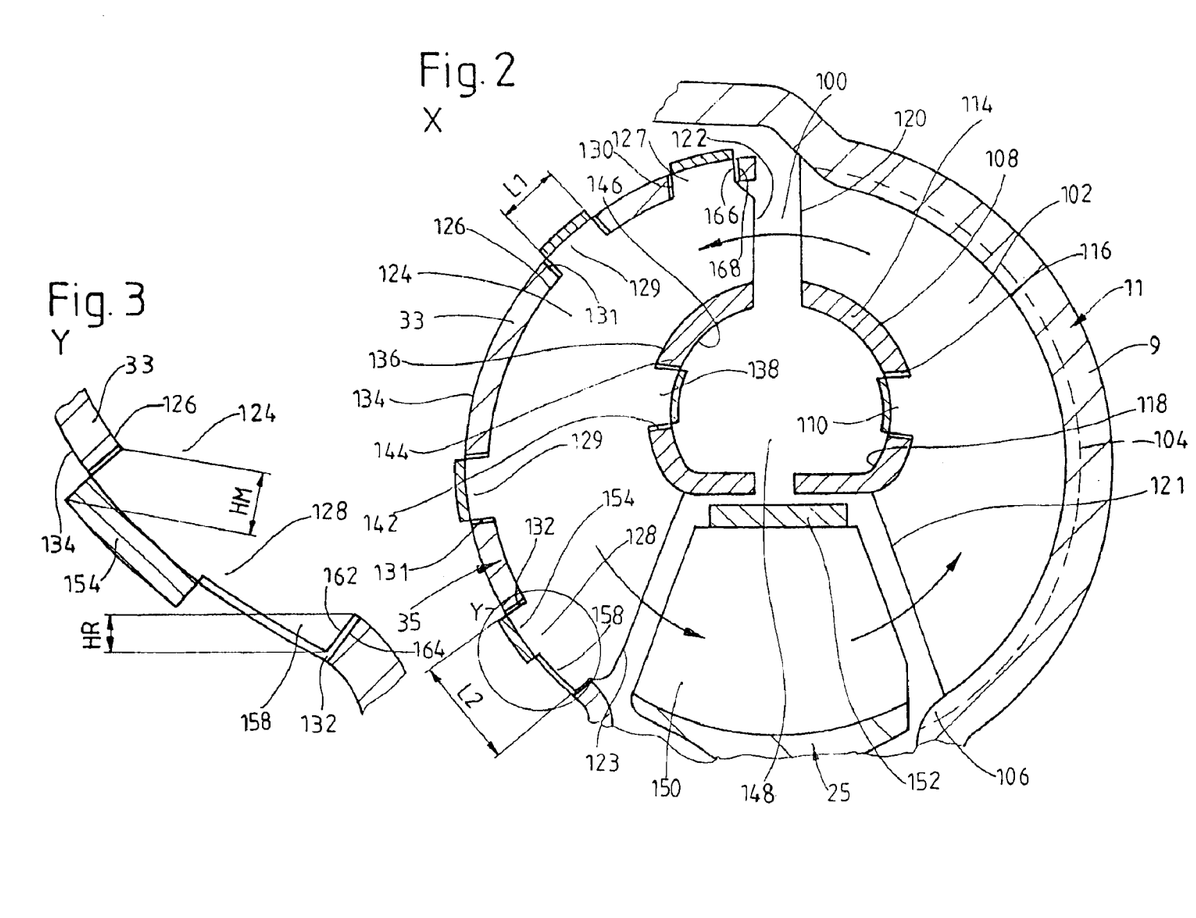
FIG. 2 is an enlarged view of the part of the hydrodynamic circuit marked "X" in FIG. 1.
FIG. 3 is an enlarged view of the detail marked "Y" in FIG. 2.

The arrows in FIG. 2 symbolize the flow direction in the hydrodynamic circuit 100, where the previously described pump wheel 11 has a trailing flow edge 120 in the radially outer area; this trailing edge works together with a leading flow edge 122 of a vane 124 of the turbine wheel 35. FIG. 2 also shows a trailing flow edge 123 in the radially inner area of the vane 124 of the turbine wheel 35, where the outgoing flow, after passing through the stator 25, arrives at the radially inner leading flow edge 121 of the vane 102 of the pump wheel 11.

Connecting elements 127–129 are provided on the vane 124 of the turbine wheel 35, namely, on the edge 126 of the vane that faces the outer shell 33 of the turbine wheel 35; these connecting elements pass through openings 130–132 in the outer shell 33. The radially outer connecting element is designated 127, the radially inner connecting element is designated 128, and the two radially intermediate connecting elements are designated 129. The radially outer opening is designated 130, the radially inner opening is designated 132, and the radially intermediate openings are designated 131.

Figure 4:
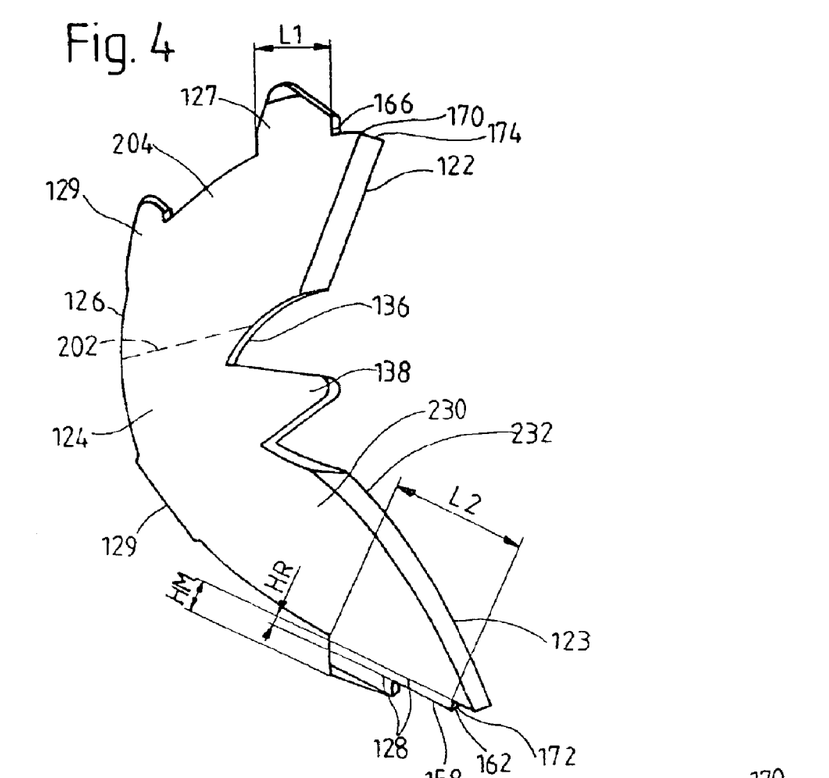
FIG. 4 is a perspective view of a vane as can be seen on the turbine wheel in FIG. 2.

FIG. 4 shows an enlarged view of the vane 124 illustrated in FIG. 2 before the vane has been installed in the turbine wheel 33, which, like the pump wheel 11, serves as a rotor. As FIG. 4 shows, the various connecting elements 127–129 are realized in the form of tabs, which project beyond the edge 126 of the vane and which pass through the corresponding openings 130–132 when the vane 124 is inserted into the outer shell 33 of the turbine wheel 35. As soon as the vane 124 has assumed its predetermined position in the outer shell 33 of the turbine wheel 35, the connecting elements 127–129 are bent over to grip the rear surface 134 of the outer shell 33. This can be done preferably by means of a rolling operation.

Then an inner shell 144 can be pushed onto the connecting element 138 projecting beyond the edge 136 of the vane 124, as can be clearly seen in FIG. 4, where this shell has an opening 142 designed to accept the connecting element 138. Here again, after the inner shell 144 has been pushed on, the free end of the connecting element 138 is bent over to grip the rear surface 146 of the inner shell 144, preferably by means of a rolling operation, and thus the final positioning of the vanes 124 in the turbine wheel 35 is achieved.

The inner shell 144 of the turbine wheel 35 and the inner shell 114 of the pump wheel 11 together form an internal torus 148, which is closed radially on the inside by the stator ring 152, mounted on the stator vanes 150 of the stator 25.

It should be pointed out that the procedure used to attach the inner shell 144 of the turbine wheel 35 to its vanes 124 can also be used to attach the inner shell 114 of the pump wheel 11 to its vanes 102. This applies not only to the previously described design of the connecting elements 110, 138 and of the openings 116, 142 according to FIGS. 2–4, but also to other designs, one of which is shown by way of example in FIGS. 6 and 7 and which will be discussed in detail later.

Figure 5:
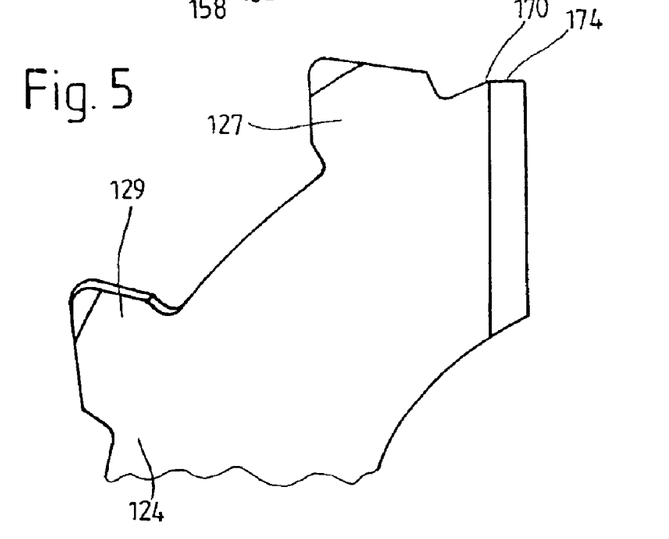
FIG. 5 is an enlarged view of the radially outer section of the vane according to FIG. 4.

It is necessary to return now to the connecting elements 127–129 on the edge 126 of the vane facing the outer shell 33 of the turbine wheel. The radially inner connecting element 128 of the vane 124 is designed with two parts, as shown in FIGS. 2–4, namely, with a retaining segment 154 as the first part, which projects by a certain minimum overhang HM beyond the edge 126 of the vane, as shown in FIGS. 3 and 4. The second part of the connecting element 128 is formed by a positioning segment 158, which is immediately adjacent to the retaining segment 154, but which has a much smaller overhang with respect to the edge 126 of the vane than the retaining segment 154 does, namely, a residual overhang HR. As can be easily seen in FIG. 3, this residual overhang HR is designed so that the positioning segment 158 fits into the opening 132 in the outer shell 33 of the turbine wheel 35 but does not project beyond the rear surface 134 facing away from the vane edge 126. The retaining segment 154, however, must project beyond the rear surface so that it can be bent over to grip the rear surface 134 of the outer shell 33 and thus attach the vane 124 firmly to the shell. By increasing the contact surface within the opening 132, however, the positioning segment 158 of the connecting element 128 increases the stability with which the vane 124 is guided in the shell 33 transversely to the main orientation of the connecting element 128; nevertheless, because of its smaller residual overhang HR, the positioning segment also makes it easier to insert the vane 124 into the shell 33. This is easy to see upon consideration of FIGS. 3 and 4 in particular, because, as a result of the formation of the positioning segment 158 with the short residual overhang HR, the vane 124 is made smaller in the radial direction than would be the case if the entire connecting element 128 had the minimum overhang HM. This design is especially advantageous when, as FIGS. 4 and 5 show, a chamfer 174 is provided in the radially outer area of the vane 124, which shortens the radially outer end 170 of the vane 124.

In a design with a chamfer 174, the radially outer end 170 of the vane 124 is preferably inserted into the shell 33 first, so that at least the radially outer connecting element 127 is fitted into the radially outer opening 130. The vane 124 thus assumes a position with respect to the shell 33 in which the chamfer 174 can act as a center around which the vane 124 can be pivoted into the outer shell 33. During this pivoting movement, the radially inner end 172 of the vane 124 will travel the greatest distance. The retaining segment 154 will first slide past the boundary 164 of the opening 132, and then, as pivoting continues, drop into the opening 132. As the vane 124 continues to pivot, the positioning segment 158 will also slide past the boundary 164 of the opening 132 and then drop into this opening 132, with the result that a support section 162 of the positioning segment 158 of the connecting element 128 comes to rest against the boundary 164 of the opening 132. Preferably both the connecting elements 127 and 128 and also the openings 130 and 132 are dimensioned and oriented with respect to each other in such a way that, after the vane 124 has been inserted, the radially outer connecting element 127 also comes to rest by its support section 166 against a boundary 168 of the opening 130 in the shell 33. If, to lock the connecting elements 127, 128 in place, it is necessary to subject the vane 124 to slight pretension in the shell 33 in order for contact to be established between the associated support sections 162, 166 of the connecting elements 127, 128 and the associated boundaries 164, 168 of the openings 130, 132, this pretension will hold the vanes 124 in the shell 33 in such a way that rattling noises are eliminated.

In conclusion, it should be remembered that, even though the primary dimension L1, for example, of the connecting element 127 designed in the conventional manner, as FIGS. 2 and 4 show, is much smaller than the dimension L2 of the connecting element 128 designed with a retaining segment 154 and a positioning segment 158, the gripping area of the connecting element 128 is still more-or-less the same as that of the other connecting elements 127, 129, because only the retaining segment 154 provides it. The positioning element 158, furthermore provides the additional advantage that the connecting element 128 can extend all the way to a point very close to the radially inner end 172 of the vane 124, and it can thus give the vane 124 the support it urgently requires in this area to withstand the pressure built up by the flow in the hydrodynamic circuit 100. To give the vane 124 even better support against this pressure, it is also possible for the trailing flow edge 123 of the vane 124 shown in FIG. 4 to be curved. It has been found that this measure increases the ability of the vane 124 to withstand the hydrodynamic pressure.

On the side facing the inner shell 144 of the turbine wheel 35, the vane 124 in FIG. 4 has only a single connecting element 138, which, in view of the desired tight radial dimensions of the inner shell 144, is easier to accommodate than two connecting elements, as done in the state of the art according to, for example, the previously cited EP 0 070 662 A1. So that the required operating strength of the vanes 124 in the turbine wheel 35 can be maintained in spite of this reduction, four connecting elements 127–129 are now provided in the area of the outer shell instead of the conventional three connecting elements illustrated in the previously mentioned state of the art, and thus the outer shell 33 of the turbine wheel 35 can be used to help support the other edge 136 of the vanes 124.

When the inner shell 144 of the turbine wheel 35 has a very small radial dimension and is therefore very sharply curved, the relatively large radial dimension of the connecting element 138 can make it difficult to bend the connecting element 138 over to grip the rear surface 146 of the inner shell 144, even after the number of connecting elements 138 has been reduced to one. For this reason it is provided according to FIG. 6 that the connecting element 138 is designed to consist of a plurality of connecting segments 180, 182, which, as a result of their short extension in the radial direction and because of their possible angular offset a (see FIG. 7) from each other, can be adapted very accurately to the sharp curvature of the inner shell 144. Just like a one-piece connecting element 138 according to FIG. 4, the connecting segments 180, 182, are preferably designed in this case to be flat, as shown concretely on the left side of FIG. 7. Because the elements are flat, the opening 142 can be made quite narrow, so that the associated connecting element 138 can be inserted without almost no play, especially in the circumferential direction of the inner shell 144, and therefore with virtually no rattling. Of course, when a plurality of connecting segments 180, 182 which are at an angle α to each other are to be inserted, the opening 142 should be designed to consist of sections 186, 188, which are also oriented to each other at the same angle α and therefore conform as closely as possible to the connecting segments 180, 182.

Figure 6:
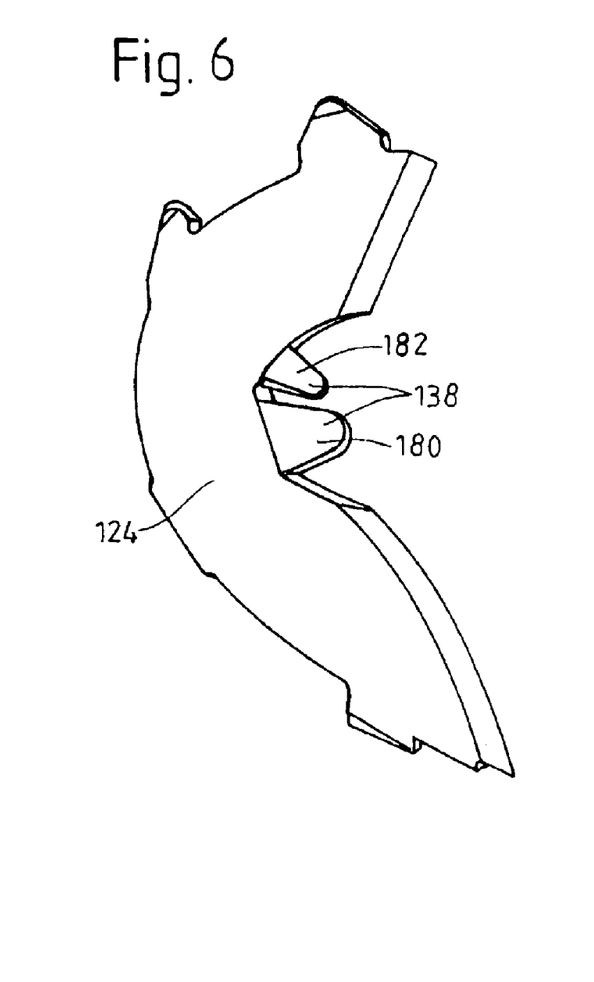
FIG. 6 is a perspective view of a vane with two connecting segments are provided on the edge of the vane facing the inner shell.
Figure 7:
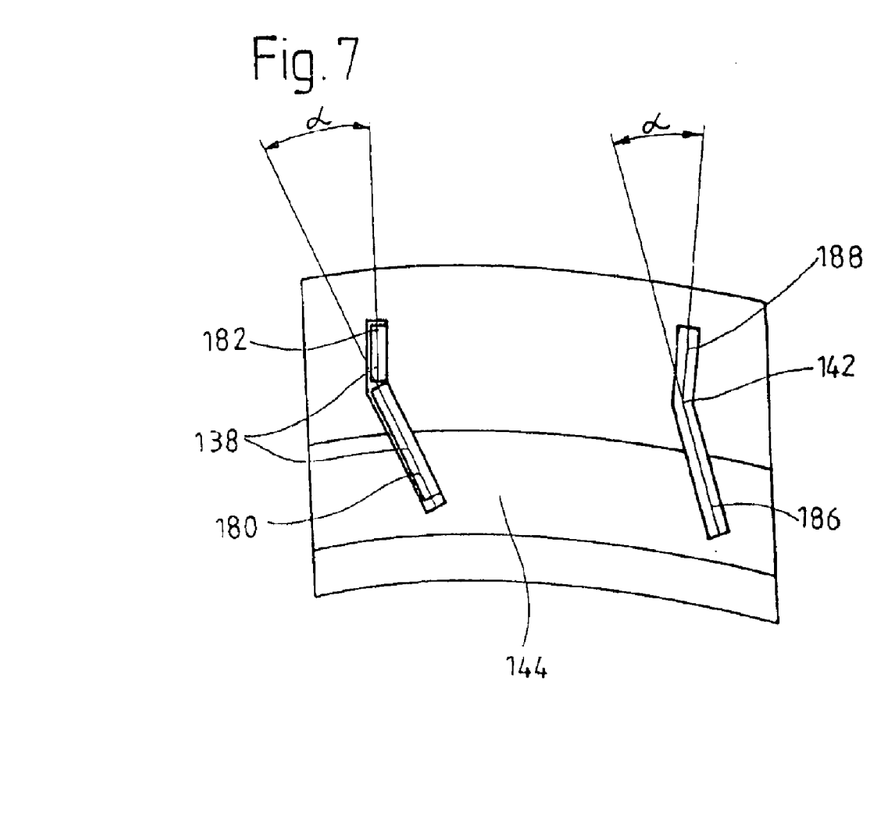
FIG. 7 is a plan view of an inner shell with the openings for the connecting segments of the vane according to FIG. 6.

The flatness of the connecting elements 138 or of the connecting segments 180, 182 offers not only the previously mentioned advantage of the more effective avoidance of rattling, but also that of the easier fabrication of the inner shell 144, because the opening 142 or the sections 186, 188 of that opening are cut out before the inner shell 144 is given its curvature, and, as the curvature of the inner shell 144 increases, the danger that the spatial arrangement and geometric shape of these openings will change relative to the connecting element 138 or to the connecting segments 180, 182 also increases. This danger is much greater when the connecting element 138 or the connecting segments 180, 182 are curved than when they are flat as in the present design. Of course, this problem also exists for the connecting elements 127–129 facing outer shell 33 of the turbine wheel 35, but there, because of the less pronounced curvature of the outer shell 33, the flatness of the elements is not so advantageous as it is in the case of the connecting elements 138 or 180, 182 projecting from the edge 136.

In contrast to FIGS. 1–7, which deal with the way in which the vanes 124, for example, are connected to the shells 33, 144 of the turbine wheel 35, FIGS. 8–11 illustrate the various processing steps involved in the production of the vanes 124. Of course, these same processing steps can also be used to produce the vanes 102 for the pump wheel 11, so that, to avoid repetition, an explicit description pertaining to the vanes 102 is omitted. The only difference between the vanes 102 and the vanes 124 is that the former do not have the connecting elements opposite the edge 126 shown in FIG. 8, for example, but this has no effect on the production steps described for the vanes.

Figure 10:
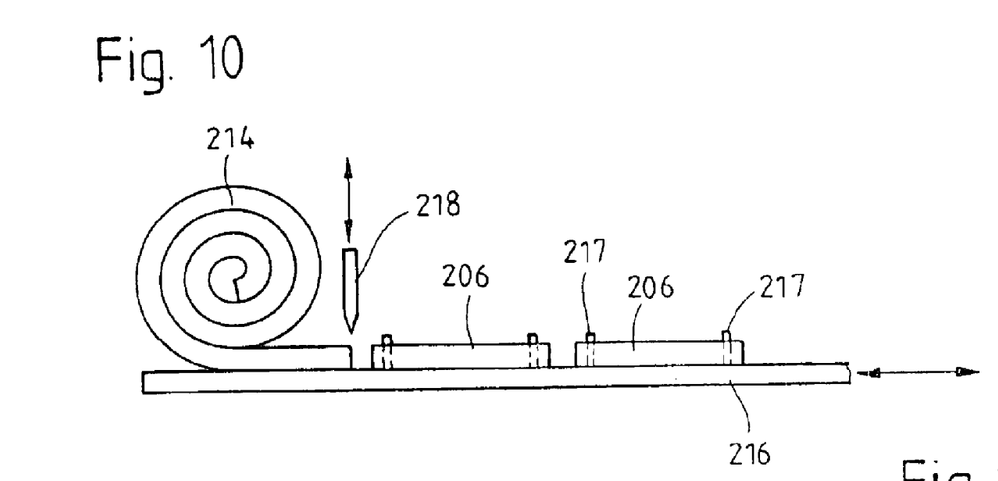
FIG. 10 shows a coil of strip material for the production of vane plates, the coil being held on a transport element.
Figure 11:
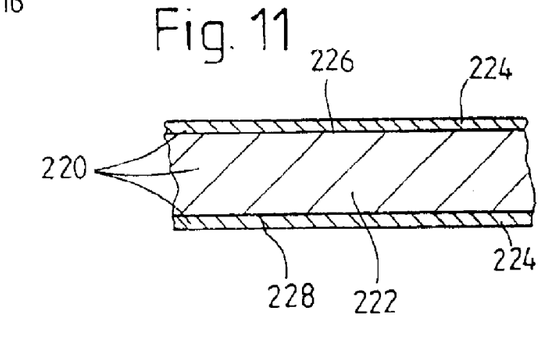
FIG. 11 shows a cross section through the plate material.

To start, FIG. 10 shows a coil 214 of strip material, from which a separating knife 218 cuts off vane plates 206 of equal length. These vane plates 206 preferably consist of a support material 222 such as conventional steel (DD 03), onto which a coating 224 of copper has been rolled to form a copper plating. The vane plates 206 can be designed with locating holes 213 (see FIG. 8), into which the locating pins 217 on a transport element 216 can fit. After they have been cut off the coil 214, the vane plates 206 are supplied by the transport element 216 to the downline processing stations.

Figure 8:
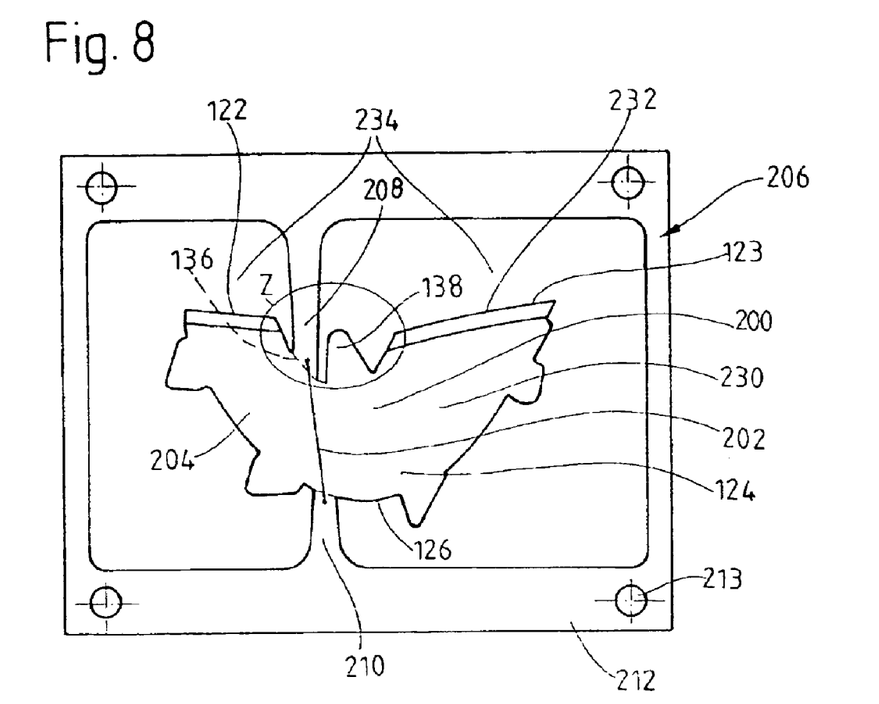
FIG. 8 shows a vane plate with a plate frame and holding fins for holding the vane.

In one of these processing stations, the vane plate 206 is processed in such a way that, as shown in FIG. 8, a plate frame 212 containing the locating holes 213 is formed; the holding fins 208, 210, which hold the vane 124, extend from this frame. The remaining part of the vane plate 206 comprises open areas 234, which are formed by removing plate material 220 from the vane plate 206 by suitable fabrication procedures.

A connecting line 202 is drawn between the two holding fins 208 and 210. This connecting line is a neutral line 202 of the vane 124, the vane being flat along the course of the neutral line 202. The area in FIG. 8 to the right of the neutral line 202 is preferably formed by a zone 200 with curvature, whereas the area to the left of the neutral line 202 can be either curved or flat. As already explained, the connecting element 138 shown in FIG. 8 is also flat.

Figure 9:
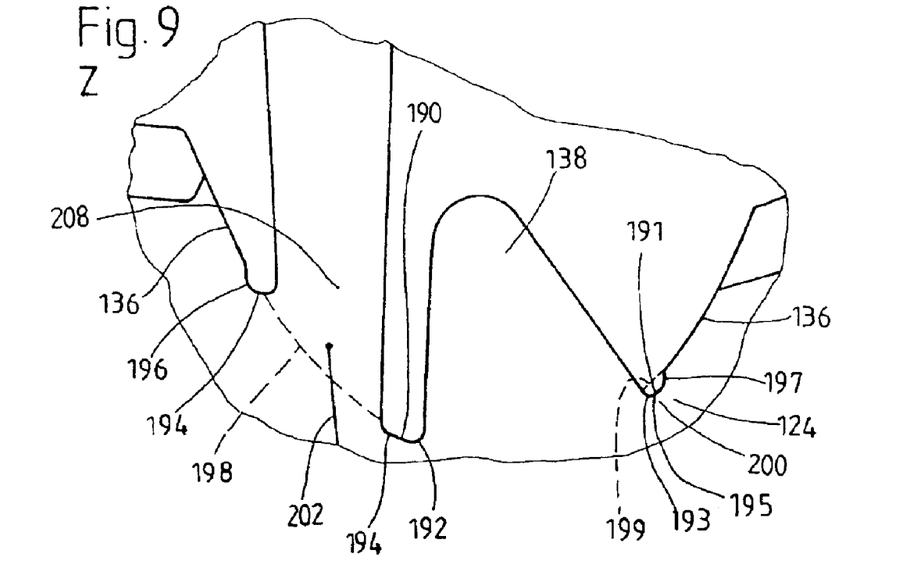
FIG. 9 shows an enlarged drawing of the detail marked "Z" in FIG. 8.

FIG. 9 shows an enlarged view of the detail marked Z in FIG. 8. On the right side of FIG. 9, the flat connecting element 138 proceeds from a root 193 by way a transition area 191 to the adjacent edge 136 of the vane, this transition area 191 being enlarged by a relief notch 195, which starts from the root 193 of the connecting element 138, proceeds across the edge 136 and into the vane 124, and returns to the edge 136 by way a predetermined transition radius 197. The following advantageous effects are afforded by this relief notch 195:

When the plate material 220 is removed from the open areas 234, a cutting tool coming from the top surface of the vane plate 206 will produce a fine cut in part of the plate material 220 but will break the remaining part of the plate material 220 lying underneath. Especially when the plate material 220 consists of a copper-plated support material 222, a cutting burr 199, shown in broken line in FIG. 9, will be pressed into the softer copper coating. After the vanes 124 have been inserted, the copper, which serves as brazing metal, is heated to bond the vanes to the shells 33, 144. Because the copper is thus removed from the burr during this bonding operation, the burr is freely exposed. An exposed burr, however, is felt to be disadvantageous especially at the transition 191 from the flat connecting element 138 to the curved zone 200 of the vane. Creating the relief notch 195 has the effect of removing the cutting burr 199 from the comparatively critical transition area between the edge 136 of the vane and the connecting element 138, and at the same time a generous transition is produced between the flat connecting element 138 and the curved zone 200 of the vane.

Comparable problems occur at the other base 192 of the connecting element 138, especially since, after the vane 124 has been completely separated from the holding fin 208, a cutting burr 198, shown in broken line in FIG. 9, remains behind. Here, too, measures are taken to remove this cutting burr 198 from a comparatively critical area and to even out over a large area any possible differences with respect to curvature which can be present between the root 192 of the connecting element 138 and the neutral line 202. Thus relief notches 194 are made in the vane 124 on both sides of the attachment point of the holding fin 208.

When the plate material 220 is removed from the open areas 234 of the vane plate 206, as already mentioned, it is obvious that a cutting burr will also be formed along the edge 126 of the vane and along the parts of the vane 124 which serve as the leading flow edge 122 and as the trailing flow edge 123 in the turbine wheel 35. Whereas the cutting burr along the vane edge 126 tends to be of rather minor importance, the cutting burr in the area of the leading flow edge 122 and/or of the trailing flow edge 123 can be disadvantageous to the course of the flow in the hydrodynamic circuit 100. For this reason, the vane plate 206 can be smoothed either after removal of plate material 220 from the open areas 234 or during a later fabrication step by means of a stamping operation in the area of the leading flow edge 122 and/or of the trailing flow edge 123. This pressing step, as shown concretely in FIG. 4, for example, has the effect of tapering the leading flow edge 122 and the trailing flow edge 123 of the vane 124, which also has a positive effect on the flow behavior in the hydrodynamic circuit 100.

Additional steps could also be carried out on the vane plate 206 after the removal of the plate material 220 from the open areas 234. For example, each of the vanes 124 could be provided with a curved zone 200, which extends along a first curvature plane 230 from the trailing flow edge 123 of the vane 124 toward the neutral line 202 (see FIG. 4). The zone 200 can also be provided with another curvature, which extends over a second curvature plane 232 along the trailing flow edge 123. This latter curvature can also be seen in FIG. 4, namely, along the course of the trailing flow edge 123. For the sake of clarity, FIG. 4 also shows the neutral line 202 in broken line, because this leads to the flat zone 204 of the vane 124.

Thus, while there have shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

What is claimed is:

1. A hydrodynamic torque converter of the type comprising a pump wheel and a turbine wheel, each said wheel comprising an outer shell, an inner shell, and a plurality of vanes connecting the shells, each said vane comprising an inner edge facing said inner shell and an outer edge facing said outer shell, each said shell having at least one opening with a length and a rear surface facing away from the vanes, each said vane of at least the turbine wheel comprising:

a plurality of connecting elements on said edges, said elements being received through respective openings in the shells and deformed against the rear surfaces of the shells to fasten the vanes to the shells, said connecting elements comprising a first connecting element comprising a positioning segment, which extends substantially the length of the respective opening, and a retaining segment, which stands proud of said positioning segment but does not extend the length of the opening, only said retaining segment being deformed against said rear surface.

2. A hydrodynamic torque converter as in claim 1 wherein said first connecting element is located proximate to a radial end of the vane.

3. A hydrodynamic torque converter as in claim 2 wherein said positioning segment extends closer to said radial end of said vane than said retaining segment.

4. A hydrodynamic torque converter as in claim 2 wherein said vane has a radial end with a chamfer opposite to said radial end proximate to said first connecting element.

5. A hydrodynamic torque converter as in claim 4 wherein said chamfer is located at a leading flow edge of said vane.

6. A hydrodynamic torque converter as in claim 1 wherein said positioning segment does not stand proud of said rear surface of said shell.

7. A hydrodynamic torque converter as in claim 1 wherein said positioning segment has a length which is greater than the length of a connecting element which does not have a positioning segment and a retaining segment.

8. A hydrodynamic torque converter as in claim 1 wherein said positioning segment has a first end and a second end, said retaining segment extending from said first end, said second end abutting an end of the opening in which the connecting segment is received.

9. A hydrodynamic torque converter as in claim 8 wherein said second end abuts said end of said opening with a predetermined pretension.

10. A hydrodynamic torque converter as in claim 9 wherein each said vane of at least the turbine wheel further comprises a second connecting element on the same edge as said first connecting element, said second connecting element having a second end facing away from the second end of the positioning segment, said second end of said second connecting element abutting an end of a respective opening with a predetermined tension.

11. A hydrodynamic torque converter as in claim 10 wherein said vane comprises a leading flow edge and a trailing flow edge, said first connecting element being adjacent to said trailing flow edge, said second connecting element being adjacent to said leading flow edge.

12. A hydrodynamic torque converter as in claim 10 wherein the first and second connecting elements lie on the outer edge, said torque converter comprising an additional connecting element between the first and second connecting elements on the outer edge, and a connecting element on the inner edge.

13. A hydrodynamic torque converter as in claim 1 comprising at least three connecting elements on the outer edge and only one connecting element on the inner edge.

* * * * *